(12) United States Patent
Masalkar (10) Patent No.: US 7,973,779 B2
(45) Date of Patent: Jul. 5, 2011

(54) DETECTING AMBIENT LIGHT LEVELS IN A VISION SYSTEM

(75) Inventor: Prafulla Masalkar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 919 days.

(21) Appl. No.: 11/924,633

(22) Filed: Oct. 26, 2007

(65) Prior Publication Data

US 2009/0109193 A1    Apr. 30, 2009

(51) Int. Cl.
*G06F 3/042* (2006.01)

(52) U.S. Cl. ...... 345/175; 116/202; 356/227; 340/815.4

(58) Field of Classification Search ........... 345/173, 345/175; 356/213–236; 116/202; 340/967, 340/948, 950, 951, 583, 815.4, 63, 469
See application file for complete search history.

(56) References Cited

U.S. PATENT DOCUMENTS

| | | | |
|---|---|---|---|
| 5,003,288 A * | 3/1991 | Wilhelm | 340/457.2 |
| 5,388,059 A | 2/1995 | DeMenthon | |
| 5,726,672 A | 3/1998 | Hernandez et al. | |
| 5,889,582 A | 3/1999 | Wong et al. | |
| 6,617,559 B1 | 9/2003 | Emery et al. | |
| 7,049,575 B2 | 5/2006 | Hotelling | |
| 7,064,492 B1 | 6/2006 | Vijeh | |
| 7,071,456 B2 | 7/2006 | Poplin | |
| 7,456,829 B2 * | 11/2008 | Fry | 345/204 |
| 7,614,753 B2 * | 11/2009 | Zavarehi et al. | 353/85 |
| 2005/0037815 A1 * | 2/2005 | Besharat et al. | 455/566 |
| 2005/0057484 A1 | 3/2005 | Diefenbaugh et al. | |
| 2005/0083293 A1 | 4/2005 | Dixon | |
| 2006/0017807 A1 | 1/2006 | Lee et al. | |
| 2006/0119540 A1 | 6/2006 | Dobson et al. | |
| 2006/0274161 A1 | 12/2006 | Ing et al. | |
| 2007/0090962 A1 * | 4/2007 | Price et al. | 340/691.1 |
| 2007/0152977 A1 * | 7/2007 | Ng et al. | 345/173 |
| 2007/0176916 A1 | 8/2007 | Choe et al. | |

FOREIGN PATENT DOCUMENTS

JP    2007140260 A    6/2007

OTHER PUBLICATIONS

ISA Korea, International Search Report of PCT/US2008/080779, May 27, 2009, 3 pages.
Kolchinsky, "Vision Systems: Seeing the Light", retrieved at <<http://www.qualtydigest.com/oct96/vision.html>>, pp. -3.
Gonzalez-Banos, et al., "Computing Depth under Ambient Illumination Using Multi-Shuttered Light", 2004 IEEE, pp. 8.

* cited by examiner

*Primary Examiner* — Richard Hjerpe
*Assistant Examiner* — Sahlu Okebato
(74) *Attorney, Agent, or Firm* — Alleman Hall McCoy Russell & Tuttle LLP (57) ABSTRACT

The detection of ambient light on an optical touch-sensitive device is disclosed. For example, one disclosed embodiment comprises capturing an image of at least a portion of a display screen with a camera located within the display device, and determined if ambient light in the image is at an acceptable level for display screen operation. Then, a visual representation is displayed representing whether the ambient light level is acceptable for display screen operation.

15 Claims, 6 Drawing Sheets

DETECTING AMBIENT LIGHT LEVELS IN A VISION SYSTEM

BACKGROUND

Touch-sensitive devices may detect touch via several different mechanisms, including but not limited to optical, resistive, and capacitive mechanisms. Some optical touch-sensitive devices detect touch by capturing an image of a backside of a touch screen via an image sensor, and then processing the image to detect objects located on the screen. Such devices may include an illuminant within the device to illuminate the backside of the display screen such that objects on the screen reflect the incident light toward the image sensor, thereby allowing the object to be detected.

One difficulty that may be encountered with optical touch screen devices involves differentiating between external (ambient) light and light reflected from the illuminant within the device. In general, the higher the ambient light level, the more difficult it may be to detect objects of interest. The ambient light forms a background noise floor that reduces contrast and makes it difficult to isolate the signal from the object. Correcting an image for ambient light may pose difficulties, as camera-based ambient light detection may be a fairly complex function depending on such factors as the ambient light source, size, distance from the camera, angle of incidence, spectral distribution, etc. Further, gauging the effect of ambient light on such a system may be difficult to do with a photometer or other such light meter in many cases.

SUMMARY

Accordingly, various methods for detecting ambient light in an optical touch-sensitive device are disclosed below in the Detailed Description. For example, one disclosed embodiment comprises capturing an image of at least a portion of a display screen with a camera located within the display device, and determined if ambient light in the image is at an acceptable level for display screen operation. Then, a visual representation is displayed representing whether the ambient light level is acceptable for display screen operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
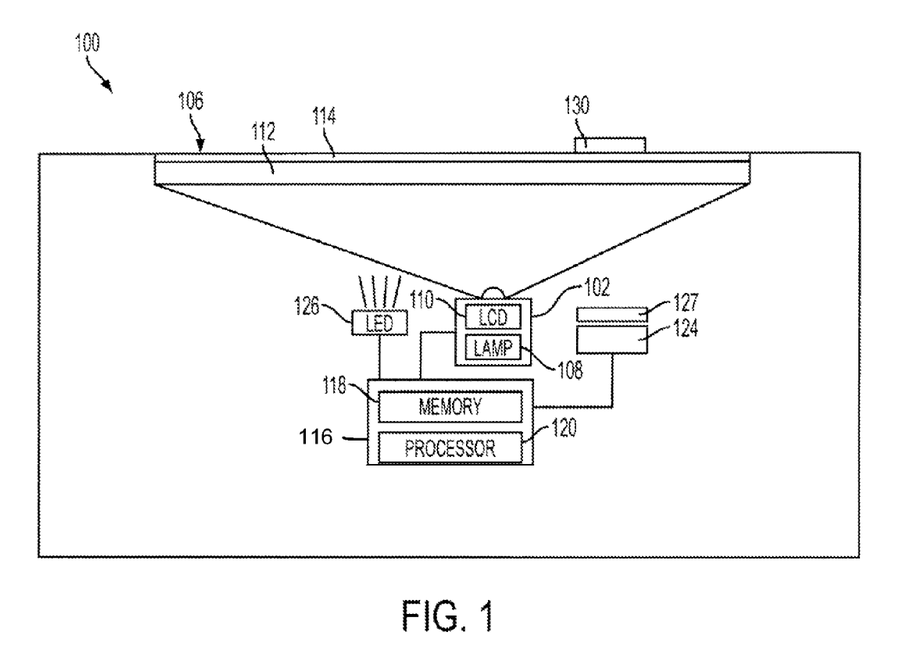
FIG. 1 shows an embodiment of an optical touch-sensitive device.

Prior to discussing the detection of ambient light acceptability in an optical touch-sensitive device, an embodiment of a suitable use environment is described. FIG. 1 shows a schematic depiction of an embodiment of an optical touch-sensitive device in the form of an interactive display device 100. The optical touch-sensitive display device 100 comprises a projection display system having an image source 102, and a display screen 106 onto which images are projected. While shown in the context of a projection display system, it will be appreciated that the embodiments described herein may also be implemented with other suitable display systems, including but not limited to LCD panel systems.

The image source 102 includes a light source 108 such as a lamp (depicted), an LED array, or other suitable light source. The image source 102 also includes an image-producing element 110 such as the depicted LCD (liquid crystal display), an LCOS (liquid crystal on silicon) display, a DLP (digital light processing) display, or any other suitable image-producing element.

The display screen 106 includes a clear, transparent portion 112, such as sheet of glass, and a diffuser screen layer 114 disposed on top of the clear, transparent portion 112. As depicted, the diffuser screen layer 114 acts as a touch surface. In other embodiments, an additional transparent layer (not shown) may be disposed over diffuser screen layer 114 as a touch surface to provide a smooth look and feel to the display surface. Further, in embodiments that utilize a LCD panel rather than a projection image source to display images on display screen 106, the diffuser screen layer 114 may be omitted.

Continuing with FIG. 1, the display device 100 further includes an electronic controller 116 comprising memory 118 and a microprocessor 120. Controller 116 may further include any other suitable electronic components, including application-specific integrated circuits (ASICs) (not shown), digital signal processors (DSPs) (not shown), field-programmable gate arrays (FPGAs), etc. configured to conduct one or more acceptable ambient light detection or feedback operations, as described below. It will further be understood that memory 118 may comprise instructions stored thereon that are executable by the processor 120 to control the various parts of device 100 to effect the methods and processes described herein.

To sense objects placed on display screen 106, the display device 100 includes an image sensor 124 configured to capture an image of the entire backside of display screen 106, and to provide the image to electronic controller 116 for the detection of objects appearing in the image. The diffuser screen layer 114 helps to avoid the imaging of objects that are not in contact with or positioned within a few millimeters of display screen 106, and therefore helps to ensure that only objects that are touching or in close proximity to display screen 106 are detected by image sensor 124.

The image sensor 124 may include any suitable image sensing mechanism. Examples of suitable image sensing mechanisms include but are not limited to CCD and CMOS image sensors. Further, the image sensing mechanisms may capture images of display screen 106 at a sufficient frequency to detect motion of an object across display screen 106. While the embodiment of FIG. 1 shows one image sensor, it will be appreciated that more than one image sensor may be used to capture images of display screen 106.

The image sensor 124 may be configured to detect light of any suitable wavelength, including but not limited to infrared and visible wavelengths. To assist in detecting objects placed on display screen 106, the image sensor 124 may further include an illuminant 126 such as one or more light emitting diodes (LEDs) 126 configured to produce infrared or visible light to illuminate a backside of display screen 106. Light from illuminant 126 may be reflected by objects placed on display screen 106 and then detected by image sensor 124. The use of infrared LEDs as opposed to visible LEDs may help to avoid washing out the appearance of images projected on display screen 106. Further, an infrared bandpass filter 127 may be utilized to pass light of the frequency emitted by the illuminant 126 but prevent light at frequencies outside of the bandpass frequencies from reaching the image sensor 124, thereby reducing the amount of ambient light that reaches the image sensor 124.

FIG. 1 also depicts an object 130 placed on display screen 106. Light from the illuminant 126 reflected by object 130 may be detected by image sensor 124, thereby allowing the object 130 to be detected on the screen. Object 130 represents any object that may be in contact with display screen 106, including but not limited to fingers, brushes, optically readable tags, etc.

In some use environments, ambient light sources may emit light in the band passed by bandpass filter 127. The term "ambient light" is used herein to describe light other than light from the illuminant 126. Examples of such ambient light sources include but are not limited to broad-spectrum light sources such as sunlight, incandescent lamp light, halogen lamp light, etc. Such light may have a sufficient intensity at the bandpass frequencies that the ambient light is difficult to distinguish from reflected light from the illuminant 126. Therefore, such ambient light may cause the display device 100 to mistakenly identify ambient light as an object on the display screen 106.

Figure 2:
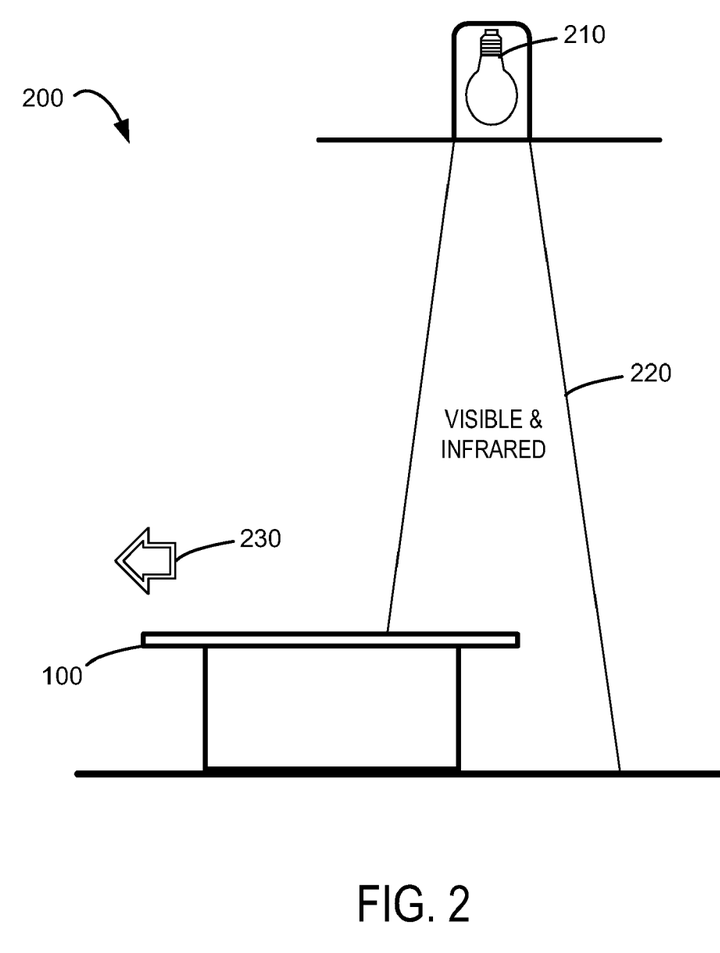
FIG. 2 shows one example of a source of ambient light shining on an embodiment of an optical touch-sensitive device.

For example, some use environments, such as the example environment 200 depicted in FIG. 2, may comprise ambient light 220 from an overhead incandescent or halogen light bulb 210. In such an environment, performance of the display device 100 may be affected by the location of the display device 100 relative to the light bulb 210. As such, the performance of the display device 100 may be improved by moving the display device 100 to a location at which less ambient light 220 from the light bulb 210 reaches the display screen, as indicated by the arrow 230.

Figure 3:
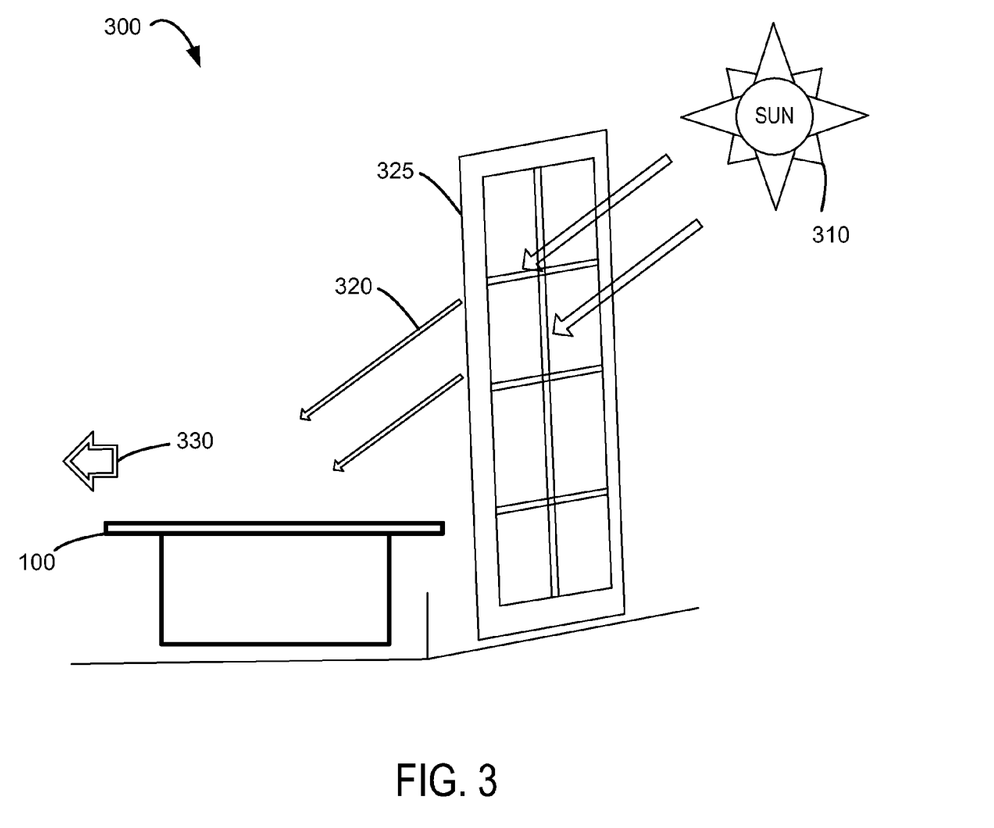
FIG. 3 shows another example of a source of ambient light shining on an embodiment of an optical touch-sensitive device.

Likewise, in other use environments, such as the example use environment 300 depicted in FIG. 3 ambient light 320 from the sun or other external source may shine on the display device 100. As depicted in this figure, such ambient light may reach the display device 100 by passing through a window 325, a door, or the like. As described above with reference to FIG. 2, the performance of the display device in environment 300 may be improved by moving the display device to a location where less external ambient light 320 reaches the display device, as indicated by arrow 330, which represents one direction that the display device 100 may be moved to avoid the ambient light 320.

Figure 4:
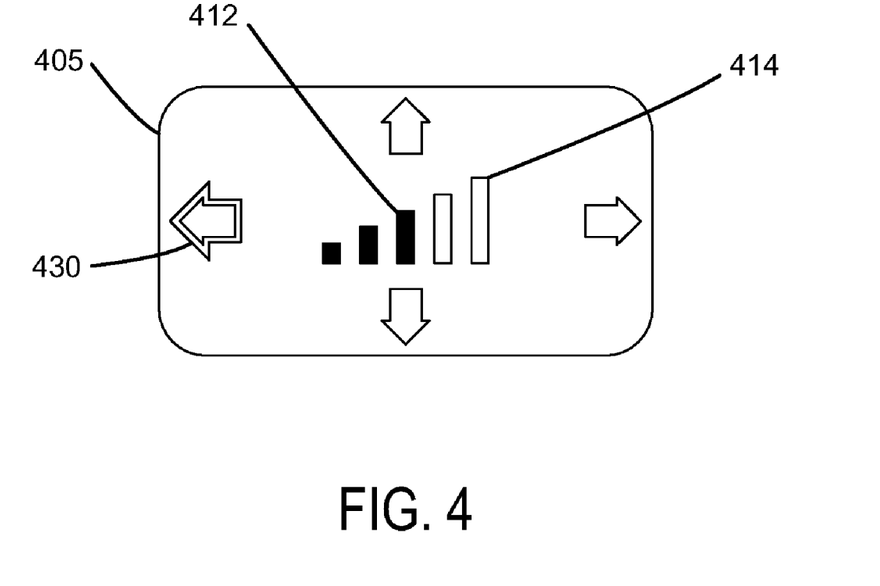
FIG. 4 shows an embodiment of a visual indicator for providing visual feedback regarding ambient light incident on an optical touch-sensitive device.

To assist a user or installer in determining a suitable location to place the display device 100 to avoid excess ambient light in a specific use environment, the display device 100 may be configured to determine a level of ambient light and then provide feedback to a user regarding whether the determined level of ambient light is unsatisfactory, and/or how to move the display device 100 to a location within the use environment with lower ambient light levels. FIG. 4 shows one embodiment of a visual indicator 405 that may be displayed on the display device 100 to provide feedback regarding ambient light levels, and also a direction to move the display device to reduce the ambient light exposure. Visual indicator 405 comprises four direction arrows, wherein one of the arrows is a highlighted arrow 430 with a different appearance than the other arrows. Highlighted arrow 430 indicates to a user of the display device 100 a direction in which the display device 100 may be moved to avoid ambient light determined to be of an unacceptable level.

The visual indicator 405 also comprises a plurality of intensity bars, to of which are shown at 412 and 414, configured to provide feedback related to the intensity of the detected ambient light. For example, FIG. 4 is shown with three shorter bars illuminated, up through bar 412, indicating a level of detected ambient light, and two taller bars, up through bar 414, not illuminated that indicate potentially higher levels of ambient light. The height of the bars may also represent an intensity of the rate of change (i.e. gradient) of the ambient light levels across the display screen 106. As the display device 100 is moved, the number of intensity bars illuminated may be updated in real-time to provide feedback of ambient light levels as the device is moved. The intensity bars may represent an average ambient level across the display screen 106, a highest ambient level detected, or any other suitable measurement of ambient light intensity. It will be appreciated that other embodiments may use other symbols or visual feedback methods, including but not limited to sounds, etc., to indicate levels of acceptable light and actions that may be taken to reduce ambient light exposure.

Figure 5:
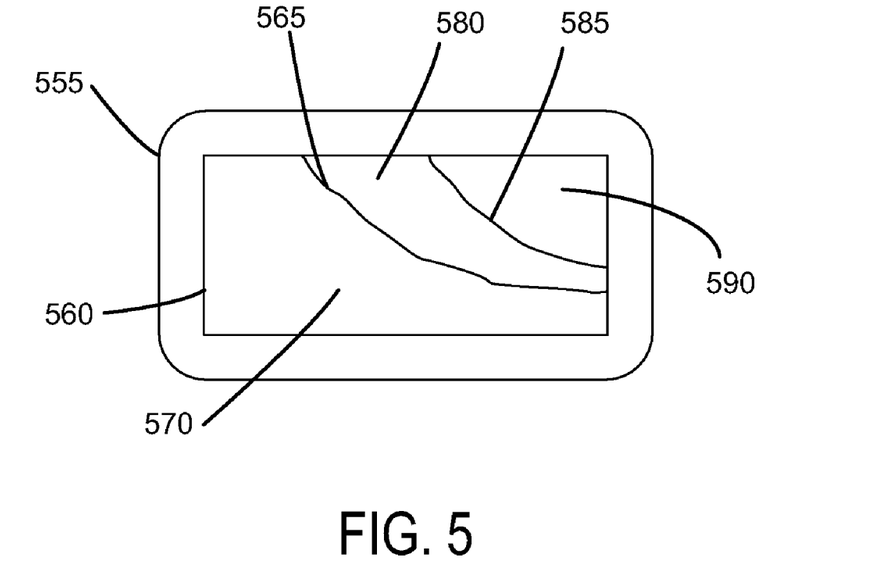
FIG. 5 shows another embodiment of a visual indicator for providing feedback regarding ambient light incident on an optical touch-sensitive device.

FIG. 5 shows a second embodiment of a visual indicator 555 for providing feedback regarding levels of ambient light incident on the display device 100. The depicted visual indicator 555 comprises a graphical representation 560 of the display screen 106. The graphical representation 560 of the display screen 106 shows a depiction of the ambient light intensity across the display device 100 as a simple representation of ambient light intensity regions 570, 580 and 590 separated by contour lines 565 and 585. The regions of ambient light intensity 570, 580 and 590 represent regions of the display device 100 that are exposed to acceptable, unacceptable or unfavorable but acceptable (or threshold), levels of ambient light. In this manner, a user or installer can determine a direction to move the display device 100 to reduce the amount of ambient light reaching the device. While three regions of light intensity are shown in FIG. 5, it will be appreciated that either more or fewer regions of light intensity may be shown.

Figure 6:
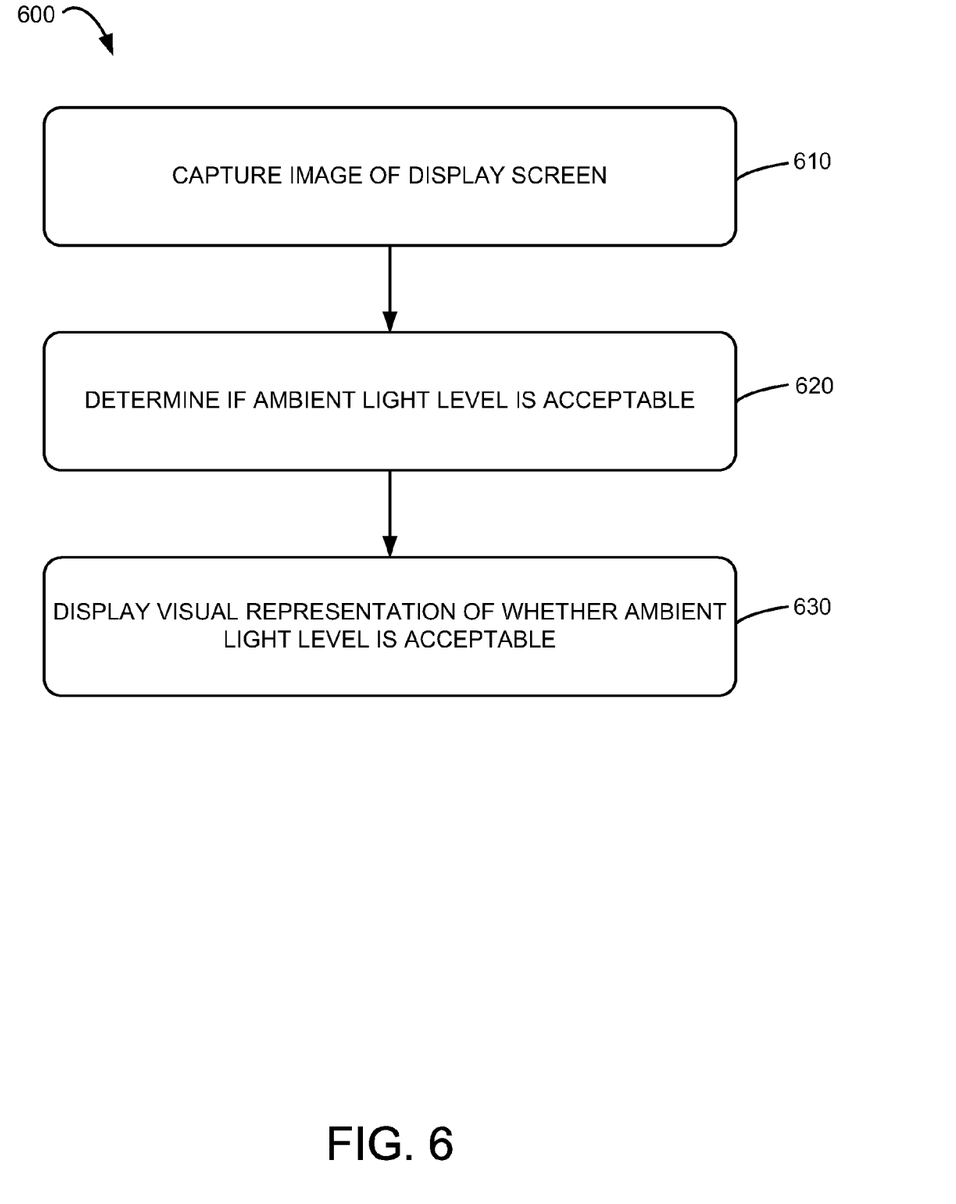
FIG. 6 shows a flow diagram illustrating an embodiment of a method for gauging vision system performance related to ambient light conditions.

FIG. 6 shows a flow diagram illustrating an embodiment of a method 600 for gauging vision system performance related to ambient light conditions. It will be appreciated that method 600 and other methods disclosed herein may be performed, for example, via software comprising instructions stored in memory 118 or other suitable machine readable medium that are executable by the processor 120 to implement the method 600.

Method 600 first comprises using at least one camera within a display device to capture images of ambient light illuminating at least a portion of a display screen, as indicated in block 610. Next, as indicated in block 620, a determination is made if the ambient light is at an acceptable level for display screen operation. Then, as indicated at block 630, a visual representation related to an acceptability of the determined ambient light level displayed on the display device. The visual representation may, for example, visually express whether a detected ambient light level is too high or suitably low for proper display device performance. Further, the visual representation may indicate a direction in which the display device may be moved to reduce the amount of ambient light incident on the display device. In this manner, the display device 100 may be moved to a location with a suitably low ambient light level. Alternatively or additionally, the ambient light source may be dimmed to a more suitable level.

Figure 7:
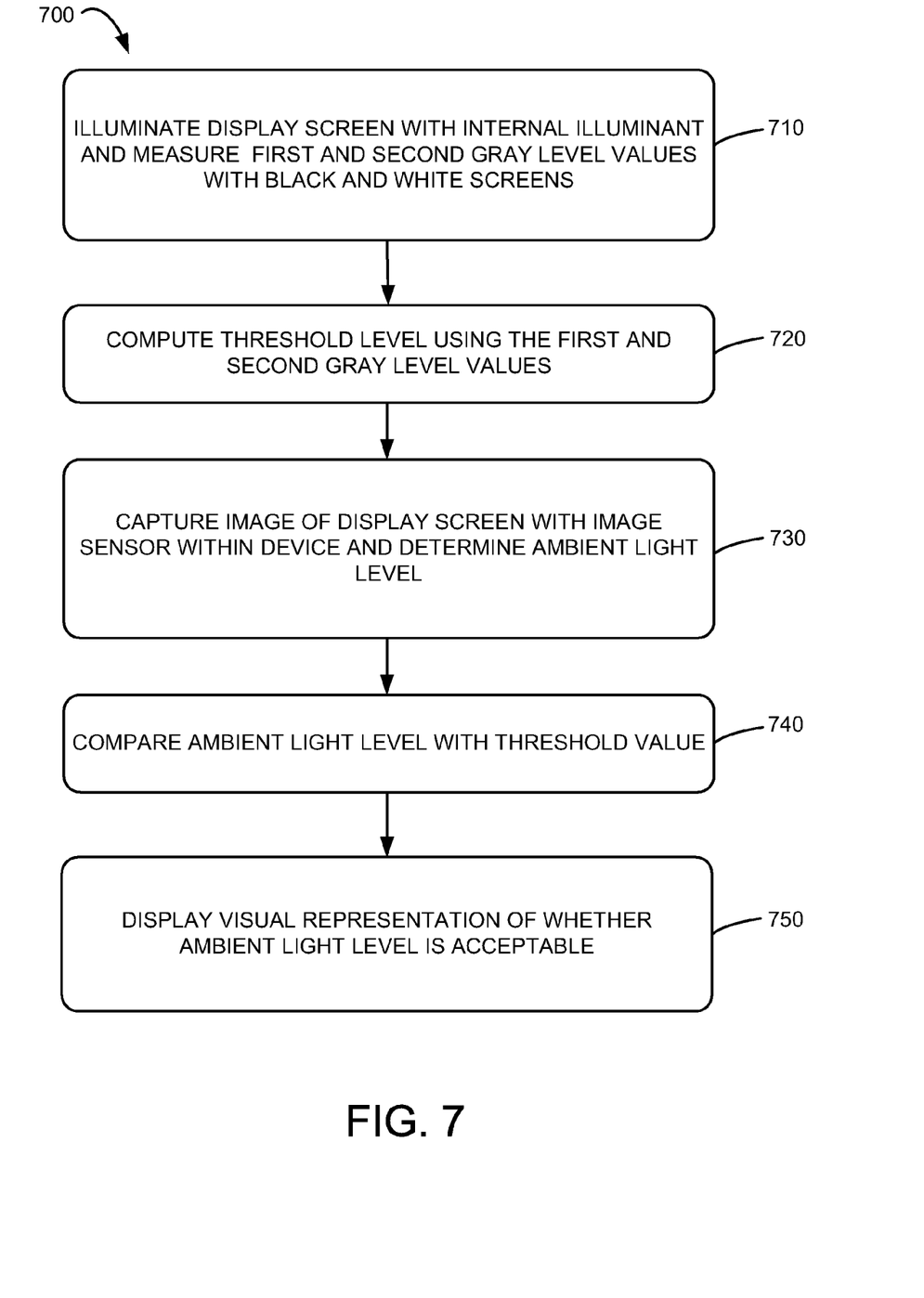
FIG. 7 shows a flow diagram illustrating another embodiment of a method for gauging vision system performance related to ambient light conditions.

FIG. 7 shows a flow diagram illustrating another embodiment of a method 700 for gauging vision system performance related to ambient light conditions. Method 700 may be used, for example, when installing the display device 100 in a use environment. As indicated in block 710, method 700 first comprises calibrating the display device 100 by illuminating display screen 106 with the illuminant 126, measuring a first gray level value via a black screen positioned over the display screen 106, and measuring a second gray level value via a white screen positioned over the display screen 106.

Next, as indicated in block 720 a threshold ambient light level is determined using the first and second gray level values. This may be performed in any suitable manner. For example, the threshold value may be selected to be a set amount, including but not limited to a value within a range of 15-25 percent, above the determined black level value by dividing the dynamic range appropriately. Further, more than one threshold may be used to generate a contour map representation of the ambient light levels across the display screen 106. It will be appreciated that this method of determining a threshold ambient light level is merely an example of one suitable method of determining a threshold level, and that other methods may be used in other embodiments. For example, in some embodiments a vision system may have an active ambient light cancellation scheme. These active ambient light cancellation scheme embodiments may operate correctly at ambient levels that do not saturate the image sensor used in the system, but may not operate correctly in ambient light levels sufficient to saturate the image sensor. Therefore, in some embodiments a threshold may be set for ambient light levels at or near image sensor saturation.

Continuing with FIG. 7, method 700 next comprises capturing one or more images of the display screen with the image sensor or sensors within the display device 100 while no object of interest is positioned on the display screen 106 to determine the level of ambient light, as indicated in block 730. After capturing the image of the display, method 700 next comprises comparing the level of ambient light on the screen with the threshold value, as illustrated in block 740. Then in block 750, the method provides a visual representation of whether the ambient light level is acceptable based upon the comparison with the threshold value. For example, as shown in FIG. 4, a highest measured ambient level or average ambient level may be displayed in a simple bar-graph, pie-graph, thermometer-style graph, etc. that shows whether the ambient level is above or below the threshold level, or in a map, as indicated in FIG. 5. Such intensity representations may be generated in any suitable manner. For example, in one embodiment, a gradient of the ambient light level is calculated for each pixel, for groups of pixels, etc., such that a plurality of gradients are calculated. A resultant directional vector is then be generated from the gradients. The general direction of the directional vector may be indicated with a highlighted arrow (such as arrow 430 in FIG. 4), and the magnitude of the directional vector may be generated by the length of the arrow, by the height of one or more graphical bars displayed on the screen, etc. Alternatively, the gradients or relative ambient light levels may be displayed in a map such as that shown in FIG. 5. Further, some embodiments may provide the visual representation in real-time to provide feedback while a vision system is being moved, for example during installation, etc.

In another embodiment, the comparison of the level of ambient light on the screen with the threshold value may comprise determining whether the ambient light level is more than a selected amount above the threshold value or more than a selected amount below the threshold value. The selected amounts may have any value, including but not limited to percentages within a range of ±5-15 percent. In one specific embodiment, a first visual representation of an ambient light level is provided for levels more than 10 percent above the threshold value, a second visual representation is provided for ambient light levels more than 10 percent below the threshold value, and a third visual representation is provided for ambient light levels within 10 percent of the threshold value. An example of such a representation is shown in FIG. 5, where region 570 may represent ambient light intensities more than 10 percent below the threshold, region 580 may represent ambient light intensities within 10 percent above or below the threshold, and region 590 may represent ambient light intensities more than 10 percent above the threshold. Such a calculation may be carried out on individual pixels, or on blocks of pixels (such as 16×16 or 32×32 pixel blocks) for efficiency.

In another variation of the present embodiment, the first visual representation may be red, the second visual representation may be green, and the third visual representation is yellow. Other embodiments may use different colors to reflect different levels of detected ambient light. In some embodiments, the colors may correspond to other well known color-coded intensity ranges or scales.

While disclosed herein in the context of an optical touch-sensitive display device, it will be appreciated that the disclosed embodiments may also be used in any other suitable optical touch-sensitive device, as well as in any other machine vision device in which a background signal correction may be performed to improve device performance.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of detecting ambient light in an optical touch-sensitive display device, the optical touch-sensitive display device comprising a display screen, an illuminant and an image sensor, the method comprising:
   capturing an image of at least a portion of the display screen with the image sensor;
   determining whether an ambient light level in the image is at an acceptable level for display screen operation; and
   displaying a visual representation of whether the ambient light level is acceptable for display screen operation, the visual representation further indicating, if the ambient light level is an unacceptable ambient light level, a direction to move the display device.

2. The method of claim 1, wherein the visual representation of whether the ambient light level is acceptable for display screen operation is updated in real-time.

3. The method of claim 1, wherein the visual representation comprises a map of relative ambient light intensities across the display screen.

4. The method of claim 3, wherein the visual representation is color-coded, and wherein a color in the visual representation represents a relative ambient light level.

5. The method of claim 1, further comprising providing a visual indicator of the direction to move the display device to correct for the unacceptable ambient light level.

6. The method of claim 5, wherein the direction to move the display device is determined by determining a plurality of gradients of ambient intensities on the display screen, and generating a directional vector from the gradients.

7. A method of installing an optical touch-sensitive device, the optical touch-sensitive device comprising a display screen, an illuminant configured to illuminate a backside of the display screen, and an image sensor configured to capture an image of a backside of the display screen, the method comprising:
   illuminating the display screen with the illuminant while measuring a first gray level value with a black screen located on the display screen, and while measuring a second gray level value with a white screen located on the display screen;
   computing a threshold level value using the first and second gray level values;
   capturing an image of the display screen;
   determining a level of ambient light in the image;
   comparing the level of ambient light on the screen with the threshold level value; and
   providing a visual representation of whether the ambient light level is acceptable for display screen operation based upon the comparison with the threshold level value.

8. The method of claim 7, wherein the image of the display screen is captured while the display screen is free of objects located on the screen.

9. The method of claim 7, wherein comparing the level of ambient light on the screen with the threshold level value further comprises:
   comparing if the ambient light level is more than a selected amount above the threshold level value or more than a selected amount below the threshold level value; and
   displaying a first visual representation of an ambient light level more the selected amount above the threshold level value, a second visual representation of an ambient light level more than the selected amount below the threshold level value, and a third visual representation if the ambient light level is not more than the selected amount above the threshold level value and not more than the selected amount below the threshold level value.

10. The method of claim 9, wherein the selected amount above the threshold level value comprises a percentage within a range of 5-15 percent.

11. The method of claim 7, wherein capturing an image of the display screen comprises capturing an image of the display screen while the illuminant is illuminating the display screen.

12. The method of claim 7, wherein the visual representation is displayed via a map of ambient light levels on the display screen or a bar graph of an ambient light level on the display screen.

13. The method of claim 7, wherein the visual representation is configured to update in real-time.

14. The method of claim 7, wherein the threshold level value comprises a value within a range of 15-25 percent above the gray level value measured with the black screen.

15. The method of claim 7, wherein computing the threshold level value comprises setting the threshold level value to a saturation ambient light level for the image sensor.

* * * * *